United States Patent
Dang et al.

(10) Patent No.: US 8,937,782 B1
(45) Date of Patent: *Jan. 20, 2015

(54) HARD DISK DRIVE ASSEMBLY INCLUDING A NVSM TO STORE CONFIGURATION DATA FOR CONTROLLING DISK DRIVE OPERATIONS

(71) Applicant: Western Digital Technologies, Inc., Irvine, CA (US)

(72) Inventors: Dean V. Dang, Fountain Valley, CA (US); Colin W. Morgan, Mission Viejo, CA (US); Philip Bernard Saram, Kuala Lumpur (MY)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/197,053

(22) Filed: Mar. 4, 2014

Related U.S. Application Data

(63) Continuation of application No. 13/465,716, filed on May 7, 2012, now Pat. No. 8,749,910.

(51) Int. Cl.
*G11B 5/02* (2006.01)
*G11B 5/09* (2006.01)

(52) U.S. Cl.
CPC ........................................ *G11B 5/09* (2013.01)
USPC ............................................. 360/55; 360/69

(58) Field of Classification Search
None
See application file for complete search history.

(56) References Cited

U.S. PATENT DOCUMENTS

| | | |
|---|---|---|
| 6,018,789 A | 1/2000 | Sokolov et al. |
| 6,057,981 A | 5/2000 | Fish et al. |
| 6,065,095 A | 5/2000 | Sokolov et al. |
| 6,078,452 A | 6/2000 | Kittilson et al. |
| 6,081,447 A | 6/2000 | Lofgren et al. |
| 6,092,149 A | 7/2000 | Hicken et al. |
| 6,092,150 A | 7/2000 | Sokolov et al. |
| 6,094,707 A | 7/2000 | Sokolov et al. |
| 6,105,104 A | 8/2000 | Guttmann et al. |
| 6,111,717 A | 8/2000 | Cloke et al. |
| 6,145,052 A | 11/2000 | Howe et al. |
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |

(Continued)

OTHER PUBLICATIONS

Office Action dated Sep. 19, 2013 from U.S. Appl. No. 13/465,716, 13 pages.

(Continued)

*Primary Examiner* — Thang Tran

(57) ABSTRACT

A hard disk drive assembly (HDA) operable with a host computer that comprises a printed circuit board assembly (PCBA) including a system on a chip (SOC). The HDA including a plurality of disks configured to store data, a plurality of heads configured to read and write data stored on the plurality of disks, a flex circuit board including a preamplifier, and configured to couple to the plurality of heads and the SOC, a flex circuit cable coupled to the flex circuit board, and a non-volatile semiconductor memory (NVSM) located in the HDA. The NVSM is configured to store configuration data for read and write operations of the HDA, wherein the configuration data is to be retrieved by the SOC for controlling the read and write operations of the HDA, and the NVSM is coupled to at least one of the flex circuit cable, the flex circuit board, or the preamplifier.

20 Claims, 5 Drawing Sheets

(56) References Cited

U.S. PATENT DOCUMENTS

| | | |
|---|---|---|
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,618,930 B1 | 9/2003 | Fish et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |

(56) References Cited

U.S. PATENT DOCUMENTS

| | | |
|---|---|---|
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |

(56) References Cited

U.S. PATENT DOCUMENTS

| | | |
|---|---|---|
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 2001/0043419 A1 | 11/2001 | Osaki |
| 2002/0101677 A1* | 8/2002 | Dykes et al. .............. 360/69 |
| 2009/0113702 A1 | 5/2009 | Hogg |
| 2009/0257142 A1 | 10/2009 | Sevvom |
| 2010/0011350 A1* | 1/2010 | Zayas .................. 717/171 |
| 2010/0205367 A1* | 8/2010 | Ehrlich et al. ............ 711/113 |
| 2010/0246048 A1 | 9/2010 | Ranmuthu |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0262812 A1 | 10/2012 | McGuire et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

OTHER PUBLICATIONS

Office Action dated Sep. 19, 2013 from U.S. Appl. No. 13/465,672, 13 pages.

Notice of Allowance dated Jan. 31, 2014 from U.S. Appl. No. 13/465,716, 12 pages.

Notice of Allowance dated Feb. 14, 2014 from U.S. Appl. No. 13/465,672, 10 pages.

\* cited by examiner

HARD DISK DRIVE ASSEMBLY INCLUDING A NVSM TO STORE CONFIGURATION DATA FOR CONTROLLING DISK DRIVE OPERATIONS

CROSS-REFERENCE TO RELATED APPLICATIONS

This application is a continuation of U.S. application Ser. No. 13/465,716, filed on May 7, 2012, entitled "HARD DISK DRIVE ASSEMBLY INCLUDING A NVSM TO STORE CONFIGURATION DATA FOR CONTROLLING DISK DRIVE OPERATIONS," which is hereby incorporated by reference in its entirety.

BACKGROUND

Today, computing devices such as personal computers, laptop computers, personal digital assistants, mobile devices, tablets, cell-phones, etc., are routinely used at work, home, and everywhere in-between. Computing devices advantageously enable the use of application specific software, file sharing, the creation of electronic documents, and electronic communication and commerce through the Internet and other computer networks. Typically, each computing device has a storage peripheral such as a disk drive. A huge market exists for disk drives for computing devices such as laptop computers, desktop computers, mobile computers, mobile devices, server computers, etc.

Disk drives typically comprise a disk and a head connected to a distal end of an actuator arm which is rotated by a pivot by a voice coil motor (VCM) to position the head radially over the disk. The disk typically comprises a plurality of radially spaced, concentric tracks for recording user data sectors and servo sectors. The servo sectors typically comprise head positioning information (e.g., a track address) which is read by the head and processed by a servo control system to control the velocity of the actuator arm as it seeks from track to track. Data is typically written to the disk by modulating a write current in an inductive coil to record magnetic transitions onto the disk surface. During readback, the magnetic transitions are sensed by a read element (e.g., a magnetoresistive element) and the resulting read signal demodulated by a suitable read channel.

To be competitive in the disk drive market, a disk drive should be relatively inexpensive and should embody a design that is adaptive for low-cost mass production, while at the same time provide high data storage capacity, provide rapid access to data, and meet ever decreasing size requirements. Satisfying these competing restraints of low-cost, high data storage capacity, rapid access to data, and decreasing size, requires innovation in each of the numerous components of the disk drive and the methods of assembly.

As an example, many laptop computer and mobile device developers are requiring that disk drives be of decreased size to meet customer demands for thin, light weight, and very portable computing devices. Disk drive manufacturers currently manufacture both the mechanical/electro-mechanical components associated with the disk drive (e.g., the disks, the heads, the actuator arms, etc., often termed the hard disk drive assembly (HDA)), as well as the computing components (e.g., the processor, the servo controller, the read/write channel, etc.) as part of a printed circuit board assembly (PCBA), that is attached to the HDA create the complete disk drive. The complete disk drive is then sent onto the computing device developer for assembly with their computing device.

DETAILED DESCRIPTION

Figure 1:
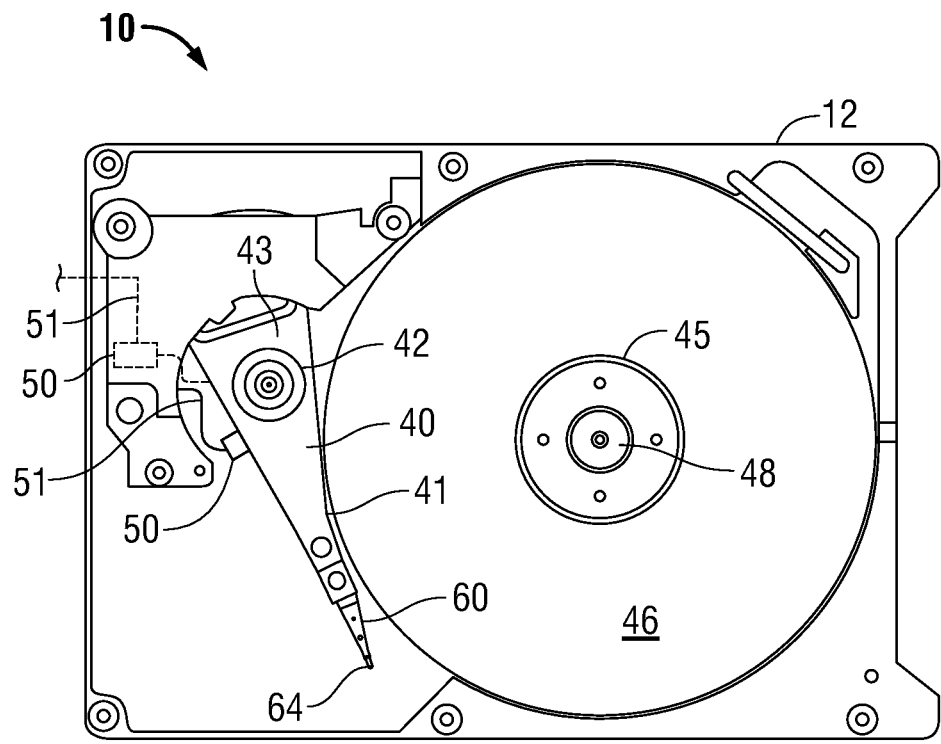
FIG. 1 shows a diagram of a hard disk drive assembly (HDA) that may be utilized to incorporate embodiments of the invention.

With reference to FIG. 1, FIG. 1 shows a hard disk drive assembly (HDA) 10 of a disk drive that may be utilized to incorporate embodiments of the invention. HDA 10 may include a disk drive base 12. At least one disk 46 may be rotatably mounted to the disk drive base 12 via spindle motor 45. A head stack assembly (HSA) 40 may be rotatably mounted to the disk drive base 12 via an actuator pivot 42. The HSA 40 may include an actuator body 43 from which a plurality of actuator arms 41 extend. At least one head gimbal assembly (HGA) 60 may be mounted to the distal end of at least one of the actuator arms 41 and each HGA 60 may include a head 64. The opposite end of each of the plurality of actuator arms 41 is a supported end adjoining the actuator body 43.

Figure 2:
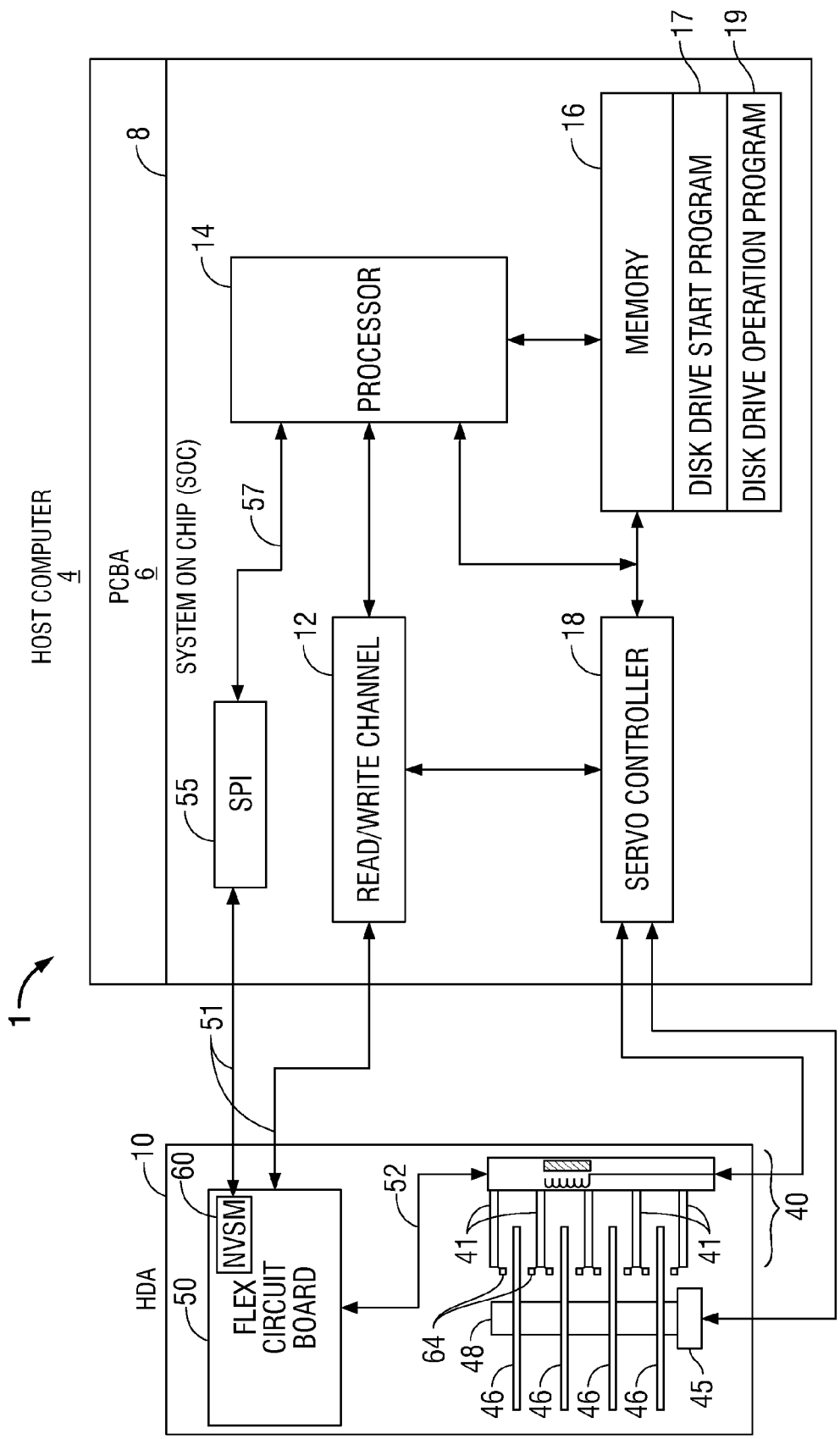
FIG. 2 shows a simplified diagram of a disk drive that includes the HDA coupled to a host computer that includes a printed circuit board assembly (PCBA), according to one embodiment of the invention.

With additional reference to FIG. 2, FIG. 2 shows a simplified block diagram of a disk drive 1 that includes HDA 10 coupled to a host computer 4 that includes a printed circuit board assembly (PCBA) 6, according to one embodiment of the invention. PCBA 6 of host computer 4 may include a system on a chip (SOC) 8 that includes typical PCBA components associated with disk drive operation such as a read/write channel 12, a processor 14, a memory 16, and a servo controller 18, as will be described in more detail. In this way, host computer 4 may include typical PCBA components associated with a disk drive and may operate in cooperation with HDA 10 to enable the operation of a complete disk drive 1, as will be described.

HDA 10 may comprise: a plurality of disks 46 for data storage; a spindle motor 45 for rapidly spinning each disk 46 on a spindle 48; and head stack assembly (HSA) 40 including a voice coil motor (VCM) for moving the plurality of actuator arms 41 and heads 64 over disks 46. As is known, each of the disks 46 may have a plurality of tracks defined by a plurality of embedded servo sectors. Each servo sector may include head positioning information such as a track address for course positioning during seeks and servo bursts for fine positioning while tracking the centerline of a target track during write/read operations. Further, each of the tracks may include data sectors between each of the servo sectors for data storage. The heads 64 via head wire(s) 52 may be connected to a flex circuit board 50 that includes a preamplifier to aid in reading and writing data to and from disks 46. Flex circuit board 50 may be connected to read/write channel circuitry 12 in the SOC 8 of host computer 4 via a flex circuit cable 51 to enable reading and writing data to and from the disks 46 under the control of SOC 8.

As can be particularly seen in FIG. 1, in one example, flex circuit board 50 may be mounted to the actuator body 43 or to a side of an actuator arm 41. The flex circuit board 50 may be connected to the heads 64 via head wires. As another example, flex circuit board 50 may be mounted to a base portion 12 of the HDA 10 closer to the entrance of the flex circuit cable 51 from the host computer 4 and to the heads 64 via head wires (e.g., see dashed lines). It should be appreciated that the flex circuit board 50 may be mounted at any suitable location of the HDA 10 dependent upon design considerations.

As can be particularly seen in FIG. 2, the SOC 8 of host computer 4 may comprise a read/write channel 12, a processor 14, a memory 16, and a servo controller 18, all of which may be used to control disk drive operations. Normal disk drive operations for reading/writing data, seeking/searching, etc., for disk drive 1, may be executed under the control of processor 14 connected to the read/write channel 12, servo controller 18, and memory 16. These types of operations may be implemented by the PCBA 8 of host computer 4 during normal disk drive operations. For example, program code executed by processor 14 may be stored in memory 16 (e.g., non-volatile memory, random access memory (RAM), etc.). As will be described in more detail, a disk drive start program 17 may be utilized for start-up or power-up of disk drive 1 and a disk drive operation program 19 may be utilized for normal disk drive operations both of which may be loaded into memory 16 for execution by processor 14. Program overlay code stored on reserved tracks of a disk(s) may also be loaded into memory 16 as required for execution.

During disk read and write operations, data transferred by HDA 10 may be encoded and decoded by read/write channel 12. For example, during read operations, read/write channel 12 may decode data into digital bits for use by processor 14. During write operations, processor 14 may provide digital data to read/write channel 12 which encodes the data prior to its transmittal to HDA 10. Read/write data may be transmitted via flex circuit cable 51 to flex circuit board 50 and from flex circuit board 50 via head wires 52 to heads 64 for reading and writing data to and from disks 46. SOC circuitry 8 may process a read signal emanating from a head 64 to demodulate the servo sectors into a position error signal (PES). The PES may be filtered with a suitable compensation filter to generate a control signal applied through the servo controller 18 to the VCM which rotates an actuator arm 41 of the actuator assembly 40 about a pivot in a direction that reduces the PES. Further, processor 14 may operate as a disk controller for formatting and providing error detection and correction of disk data, a host interface controller for responding to commands from host computer 4, and as a buffer controller for storing data which is transferred between disks 46 and host computer 4.

Servo controller 18 provides an interface between processor 14 and HDA 10. Processor 14 may command logic in servo controller 18 to position actuator arms 41 and heads 64 using the VCM driver of the actuator assembly 40 and to precisely control the rotation of a spindle motor to spin the disks 46. Disk drive 1 may employ a sampled servo system in which equally spaced servo sectors are recorded on each track of each disk 46. Data sectors may be recorded in the intervals between the servo sectors on each track. Servo sectors may be sampled at regular intervals by servo controller 18 to provide servo position information to processor 14. Servo sectors may be received by read/write channel 12 and are processed by servo controller 18 to provide position information to processor 14. It should be appreciated that this is a simplified description of a disk drive 1 and that many different types of disk drive implementations may be implemented in accordance with embodiments of the invention.

According to one embodiment of the invention, a disk drive 1 is provided that is operable with a host computer 4 in which the host computer 4 includes the PCBA 6. As previously described, PCBA 6 includes a SOC 8 that is operable on the host computer 4 and that includes all of the typical electronic components of a PCBA that are typically mounted within the disk drive itself—including a read/write channel 12, a processer 14, a memory 16, and servo controller 18—for conducting normal disk drive operations. In this way, the HDA 10 is mounted or coupled to the host computer 4 and the host computer includes the PCBA 6 circuitry. It should be appreciated that the host computer 4 may be any type computing device (e.g., laptop computer, desktop computer, server computer, mobile computer, mobile device, etc.). However, it should be appreciated that when the host computer 4 is a smaller/portable type of computing device (e.g., laptop computer, mobile device, etc.), that by simply attaching the HDA 10 to the host computing device 4 that already includes the PCBA 6 functionality, that this enhances the thinness of the portable computing device and lowers the weight of the portable computing device.

In one embodiment, disk drive 1 includes HDA 10 and a non-volatile semiconductor memory (NVSM) 60 that is located in the HDA 10. The NVSM 60 located in the HDA 10 may be coupled to the processor 14 of the SOC 8 of the host computer 4 by flex circuit cable 51 which couples to a serial peripheral interface (SPI) 55 of SOC 8 that is coupled to the processor 14 of SOC 8 by link 57. NVSM 60 may be configured to store configuration data for disk drive operations. In particular, the configuration data may be configured to be retrieved by the SOC 8 for controlling disk drive operations, as will be described. As an example, the NVSM may include a flash memory. However, it should be noted that the term non-volatile semiconductor memory (NVSM) may refer to any type of non-volatile memory or non-volatile storage that may be a type of memory that retains stored information even when it is not powered. Example of non-volatile memory may include read-only memory, flash memory, ferroelectric RAM (F-RAM) as well as other types of non-volatile memory.

Figure 3:
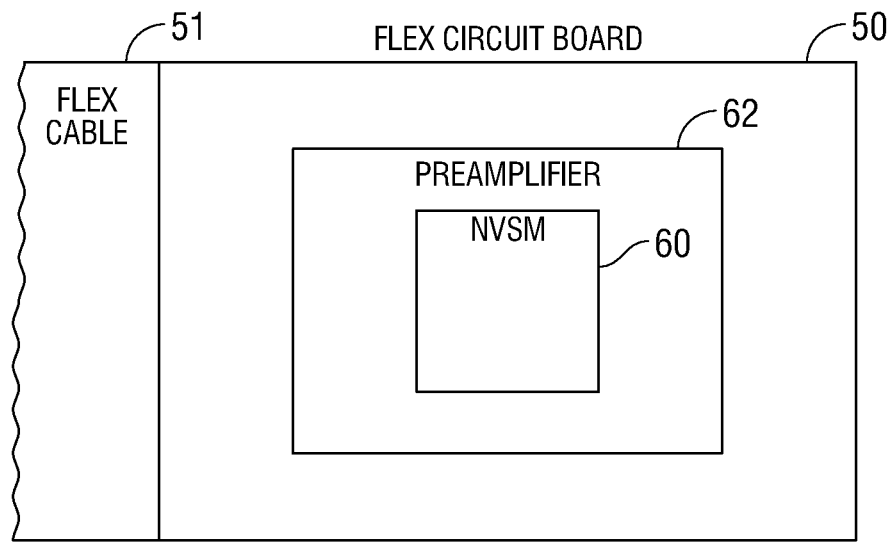
FIG. 3 shows a simplified diagram of a flex circuit cable coupled to a flex circuit board including a preamplifier and a non-volatile semiconductor memory (NVSM), according to one embodiment of the invention.

As previously described, HDA 10 may include a flex circuit cable 51 coupled to a flex circuit board 50 that is coupled through head wires 52 to aid in communicating read/write data between heads 64 and PCBA 6. With brief additional reference to FIG. 3, flex circuit cable 51 may be coupled to flex circuit board 50 and flex circuit board 50 may include a preamplifier 62. Preamplifier 62 may operate to transfer data to and from disks 46 by generating write currents that are passed on by head wires 52 through heads 64 during write operations and by detecting and amplifying read signals received by heads 64 during read operations. As one example, NVSM 60 may be located within the preamplifier 62 of the flex circuit board 50. However, NVSM 60 may also be located within and/or coupled to at least one of the flex circuit cable 51, the flex circuit board 50, or the preamplifier 62, or any combination thereof. Further, it should be appreciated that NVSM 60 may be located at any suitable location within HDA 10. As previously described with reference to FIG. 1, flex circuit board 50 including NVSM 60 may be mounted to the actuator body 43, a side of an actuator arm 41, or to any suitable location of the HDA 10 dependent upon design considerations. For example, it may be beneficial to mount the flex circuit board 50 including NVSM 60 in the HDA 10 at location close to the PCBA 6 of the host computer 4 via flex circuit cable 51 (e.g., see dashed lines of FIG. 1).

Figure 4:
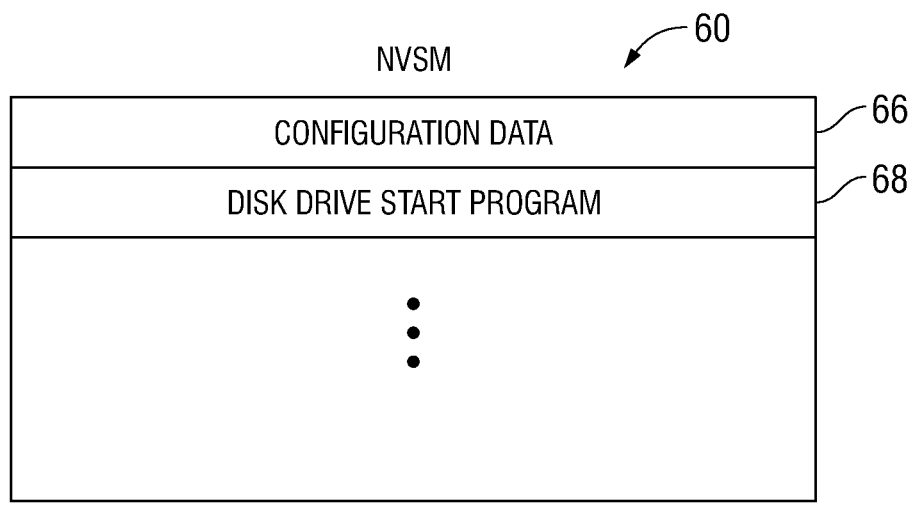
FIG. 4 shows a simplified diagram of the NVSM including configuration data and a disk drive start program, according to one embodiment of the invention.
Figure 5:
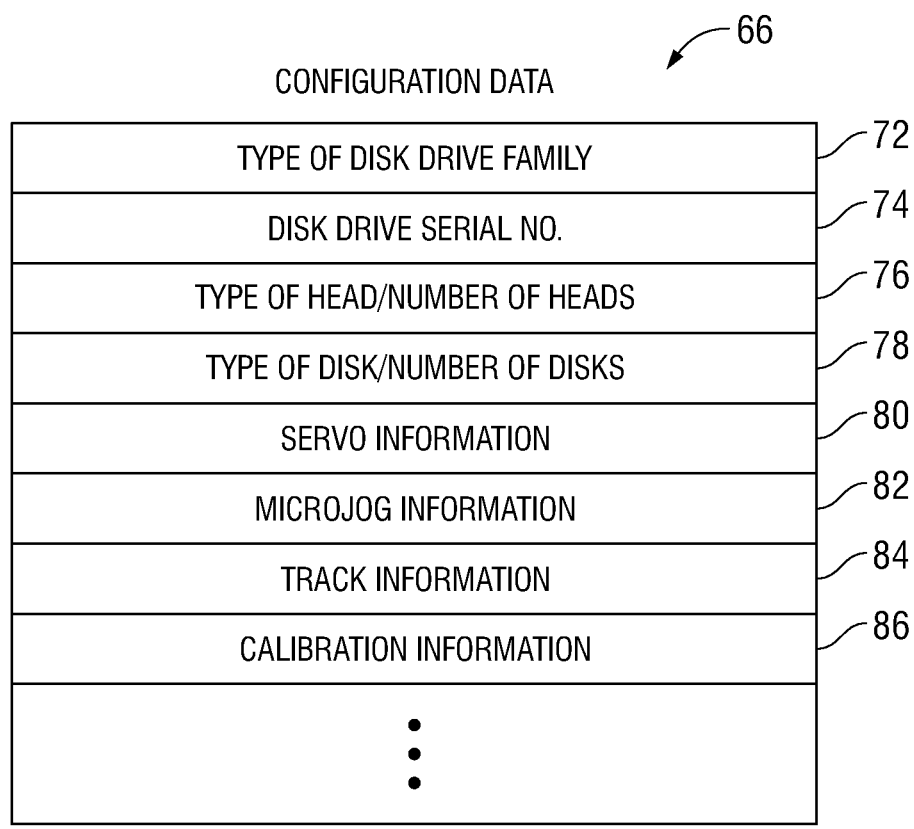
FIG. 5 shows a table of configuration data, according to one embodiment of the invention.

With brief additional reference to FIG. 4, in one embodiment, NVSM 60 may include configuration data 66 and a disk drive start program 68. As an example, the disk drive start program 68 may be a firmware program. Further, NVSM 60 may store other data and programs as well. Also, with brief additional reference to FIG. 5, in one embodiment, configuration data 66 may include a plurality of different types of configuration data entries. For example, configuration data 66 may include: the type of disk drive family 72, the disk drive serial number 74, the type of head and the number of heads 76, the type of disk and the number of disks 78, servo information 80, microjog information 82, track information 84, calibration information 86, etc. It should be appreciated that a wide variety of different types of configuration data may be stored in the NVSM 60 and that these are just examples. As will be described, the SOC 8 of the host computer 4 may be configured to retrieve the configuration data 66 from the NVSM 60 and based upon the configuration data may control disk drive operations.

As an example, in operation, to start-up up the disk drive 1, the processor 14 of SOC 8 of the host computer 4 may retrieve the configuration data 66 and the disk drive start program 68 from the NVSM 60 of the HDA 10 through flex circuit cable 51 coupled to SPI 55 of SOC 8 and via link 57 coupled to processor 14. The SOC 8 of the host computer 4 may store the disk drive start program 17 in memory 16 such that processor 14 of the SOC 8 under control of the disk drive start program 17 may start-up disk drive 1. After disk drive 1 is started-up, SOC 8 of the host computer 4 may perform normal disk drive operations under disk drive operation program 19 also received from the HDA 10. These operations will be discussed in more detail hereinafter.

In starting-up disk drive 1, the disk drive start program 17 under the control of processor 14 of the SOC 8 of the host computer 4 may read and utilize configuration data 66 stored in the NVSM 60. For example, servo data 80 related to servo gain, servo detection thresholds, etc., may be utilized by servo controller 18 to synch-up the servo controller 18. Microjog information 82 may be utilized to account for the distances between the read and write heads. Track information 84 may be utilized to determine the number of tracks on the disk and the location of the disk drive operation program 19 stored at reserved tracks. Calibration information 86 related to preamplifier gains for heads, temperature data related to start-up, write current magnitudes, etc., may be utilized to aid the disk drive start program 17 in starting-up the disk drive 1. Further, a wide variety of other types of configuration data 66 may be utilized by the disk drive start program 17 to start-up the disk drive 1 such as: the type of disk drive family 72, the disk drive serial number 74, the type of head and the number of heads 76, the type of disk and the number of disks 78, etc. It should be appreciated that the use of calibration information to start-up a disk drive itself is known.

However, according to embodiments of the invention, an HDA 10 is manufactured that includes a NVSM 60 that stores both configuration data 66 and a disk drive start program 68 that may be read and implemented by the PCBA 6 of a host computer 4. In this way, a host computer 4 may read and implement the disk drive start program 68 stored at the HDA 10 based upon configuration data 66 also stored by HDA 10 to start-up the disk drive.

As an example, in operation, after the host computer 4 is turned on, disk drive 1 may be started-up. As part of the start-up process, the disk drive start program 68 is read from the NVSM 60 and stored in memory 16 of the SOC 8 as disk drive start program 17 and is implemented by processor 14 of the SOC 8. Further, configuration data 66 may be read from the NVSM 60 by the SOC 8 of the host computer 4 to aid processor 14 in implementing the disk drive start program 17 to start-up the disk drive. For example, in the disk drive start-up: the spindle motor 45 may be spun up and disks 46 sped up to a pre-determined rotational speed; the actuator 40 may rotate the arms 41 such that the heads 64 are loaded out over the surfaces of the disks 46; and servo controller 18 may be synchronized such that the heads are synchronized to read the disk media. All of this may be based on the configuration data 66 and the disk drive start program 68 retrieved by the SOC 8 of the host computer 4 from the NVSM 60 stored on the HDA 10 itself.

Further, after start-up, the disk drive operation program 19 is read from a reserved track area of one or more of the disks 46 and loaded into memory 16 of the SOC 8 of the host computer 4 such that the processor 14 of the PCBA 6 of the host computer 4 can implement normal disk drive operations. Disk drive operation program 19 may be stored as a firmware program in a reserved track area of one or more of the disks 46. However, it should be appreciated that disk drive operation program 19 may also be stored in flash memory or in another type of memory of the HDA 10.

Figure 6:
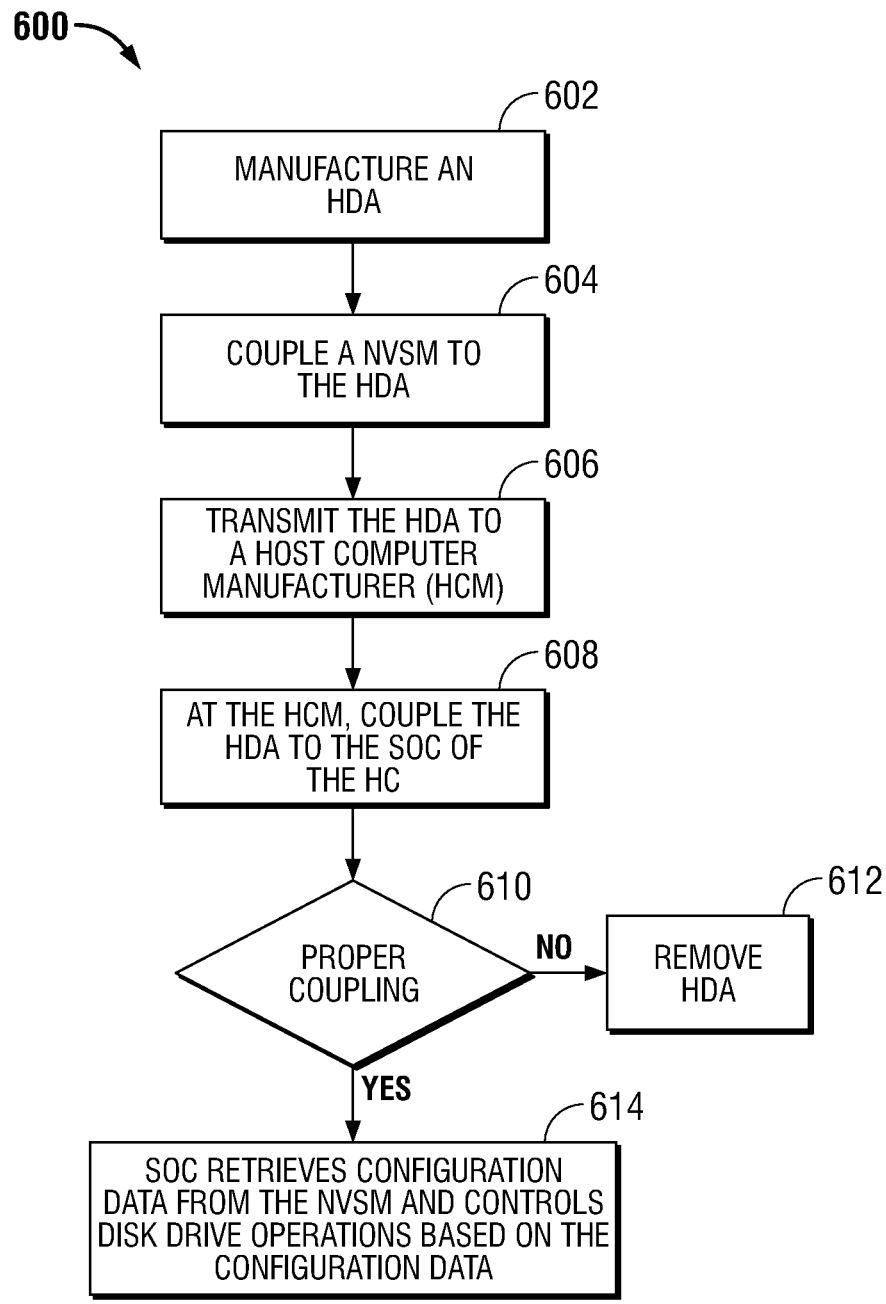
FIG. 6 is a flow diagram illustrating a process of manufacturing a disk drive in which the disk drive is operational with a host computer that itself includes a PCBA, according to one embodiment of the invention.

With additional reference to FIG. 6, FIG. 6 is a flow diagram illustrating a process 600 of manufacturing a disk drive in which the disk drive is operational with a host computer that itself includes a PCBA. For example, the PCBA may include a SOC 8 having a read/write channel 12, a processor 14, a memory 16, and a servo controller 18 to implement both disk drive start-up and normal disk drive operations, as previously described.

In one embodiment, process 600 includes manufacturing a HDA (block 602). As previously described, an HDA 10 may be manufactured that includes coupling a NVSM 60 to a portion of the HDA itself (block 604). As previously described examples, the NVSM 60 may be located within or coupled to at least one of a flex circuit cable 51, a flex circuit board 50, or a preamplifier 62, and/or combinations thereof. Also, the NVSM 60 may be a flash memory and may be configured to store configuration data 66 and a disk drive start program 68 to enable disk drive start-up by the PCBA of the host computer.

Next, the HDA 10 is transmitted to a host computer manufacturer (HCM) (block 606). At the HCM, the HDA 10 may be coupled to the SOC 8 of the host computer 4 (block 608), where it can be tested to see if proper coupling (decision block 610) has occurred. If proper coupling does not occur such that the HDA 10 does not interface correctly with the host computer 4 for disk drive operations then the HDA 10 is removed (block 612). It should be appreciated that properly coupling may refer to the HDA 10 properly connecting physically to the host computer 4 and properly starting-up and properly performing normal disk drive operation tests with the host computer 4 to make sure the disk drive correctly interfaces with the host computer.

On the other hand, when proper coupling occurs, the SOC 8 of the host computer 4 retrieves the configuration data 66 from the NVSM 60 of the HDA 10 and controls disk drive operations based on the configuration data (block 614). In particular, when proper coupling occurs, the SOC 8 of the host computer 4 retrieves the configuration data 66 from the NVSM 60 and the disk drive start program 68 from the NVSM 60 and properly starts-up the disk drive by implementing the disk drive start program 17 by the SOC 8 of the host computer 4, as previously described. After successful start-up, the disk drive operation program may be read from a reserved track section of one of the disks and stored as disk drive operation program 19 and may be implemented by processor 14 of the SOC 8 of the host computer 4 to perform normal disk drive operations. In particular, disk drive 1 may be tested to ensure that it operates properly. If disk drive 1 passes testing, an optimization process may be run to optimize the disk drive's performance with the host computer 4.

In this way, an HDA 10 may be manufactured and sent to a host computer manufacturer where it is connected to the host computer 4 and tested. The host computer manufacturer can simply attach the HDA 10 to the host computer 4 and perform start-up and testing to see if the disk drive 1 operates correctly. The disk drive start up program 68 and configuration data 66 are already conveniently stored in the NVSM 60 of the HDA 10 itself (along with the disk operation program already stored on disk) such that the PCBA 6 of the host computer 4 can start-up, test, and optimize the disk drive 1 for operation with the host computer 4.

Because the corresponding PCBA 6 is already present in the circuitry of the host computer 4, the HDA 10 is simply attached to the host computer and connected to the existing PCBA 6 by the host computer manufacturer. This allows for the host computer 4 to be manufactured in a thinner and lighter weight fashion and at a lower cost. This may be beneficial for laptop computers and mobile computing devices that seek further thinness and lighter weight to enhance portability. Further, disk drive manufacturers only have to develop the mechanical/electro-mechanical components of the HDA 10 associated with the disk drive (e.g., the disks, the heads, the actuator arms, etc.), whereas the PCBA functionality may be implemented within the circuitry of the computing device itself, thereby reducing the overall cost of the development of the disk drive as well as the host computer itself.

It should be appreciated that host computer 4 may be any type of computing device, such as, a desktop computer, a laptop computer, a mobile computer, a mobile device, a sever computer, etc. It should be appreciated that host computer 4 may operate under the control of programs, firmware, or routines to execute the methods or processes in accordance with the embodiments of the invention, previously described. Further, it should be appreciated that embodiments of the invention may relate to various types of disk drives and HDAs 10 having various numbers of heads, disks, and storage capability.

For purposes of the present specification, it should be appreciated that the terms "system on chip," "printed circuit board assembly," "processor," "read/write channel," "servo controller," etc., refer to any machine or collection of logic that is capable of executing a sequence of instructions and shall be taken to include, but not limited to, general purpose microprocessors, special purpose microprocessors, central processing units (CPUs), digital signal processors (DSPs), application specific integrated circuits (ASICs), multi-media controllers, signal processors, microcontrollers, etc.

Components of the various embodiments of the invention may be implemented as hardware, software, firmware, microcode, or any combination thereof. When implemented in software, firmware, or microcode, the elements of the embodiment of the invention are the program code or code segments that include instructions to perform the necessary tasks. A code segment may represent a procedure, a function, a sub-program, a program, a routine, a sub-routine, a module, a software package, or any combination of instructions, data structures, or program statements.

The program, instruction, or code segments may be stored in a processor readable medium. The "processor readable or accessible medium" may include any medium that can store, transmit, or transfer information. Examples of accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The processor readable or accessible medium may include data that, when accessed by a processor or circuitry, cause the processor or circuitry to perform the operations described herein. The term "data" herein refers to any type of information that is encoded for machine-readable purposes. Therefore, it may include programs, code, data, files, etc.

The methods and processes described previously may be employed by a disk drive that includes a hard disk drive assembly (HDA) having a non-volatile semiconductor memory (NVSM) located in the HDA to store configuration data. However, it should be appreciated, that other types of data storage devices with similar or other media format characteristics may be utilize aspects of the invention.

What is claimed is:

1. A hard disk drive assembly (HDA) that is operable with a host computer that comprises a printed circuit board assembly (PCBA) including a system on a chip (SOC), the HDA comprising:
    a plurality of disks configured to store data;
    a plurality of heads configured to read and write data stored on the plurality of disks;
    a flex circuit board including a preamplifier, and configured to couple to the plurality of heads and the SOC of the host computer;
    a flex circuit cable coupled to the flex circuit board; and
    a non-volatile semiconductor memory (NVSM) located in the HDA, that is couplable to the SOC of the host computer, the NVSM configured to store configuration data for read and write operations of the HDA, wherein the configuration data is to be retrieved by the SOC for controlling the read and write operations of the HDA;
    wherein the NVSM is coupled to at least one of the flex circuit cable, the flex circuit board, or the preamplifier.

2. The HDA of claim 1, wherein the NVSM comprises flash memory.

3. The HDA of claim 1, wherein the SOC is configured to retrieve the configuration data from the NVSM and to control the read and write operations of the HDA based upon the configuration data.

4. The HDA of claim 1, wherein the SOC comprises a processor and the NVSM stores a disk drive start program such that the processor under the control of the disk drive start program controls the read and write operations of the HDA.

5. The HDA of claim 4, wherein the disk drive start program comprises firmware.

6. The HDA of claim 4, wherein the SOC further comprises a read/write channel and a servo controller.

7. The HDA of claim 1, wherein the configuration data comprises data indicating at least one of a type of disk drive family or a disk drive serial number.

8. The HDA of claim 1, wherein the configuration data comprises data indicating at least one of a type of head or a type of disk.

9. The HDA of claim 1, wherein the configuration data comprises at least one of: servo information, microjog information, track information, or calibration information.

10. A method of manufacturing a hard disk drive assembly (HDA), wherein the HDA is operable with a host computer that comprises a printed circuit board assembly (PCBA) including a system on a chip (SOC), the method comprising:
  manufacturing a hard disk drive assembly (HDA), that is couplable to the SOC of the host computer, the HDA comprising:
    a plurality of disks configured to store data, a plurality of heads configured to read and write data stored on the plurality of disks;
    a flex circuit board including a preamplifier, the flex circuit board being configured to couple to the plurality of heads and the SOC of the host computer;
    a flex circuit cable coupled to the flex circuit board; and
    a non-volatile semiconductor memory (NVSM) located in the HDA; and
  coupling the NVSM to at least one of the flex circuit cable, the flex circuit board, or the preamplifier, wherein the NVSM is configured to store configuration data for read and write operations of the HDA, and wherein the configuration data is to be retrieved by the SOC on the host computer such that during the read and write operations of the HDA, the SOC uses the configuration data to control the read and write operations of the HDA.

11. The method of claim 10 further comprising coupling the HDA to the SOC of the host computer wherein, upon start-up, the SOC is configured to retrieve the configuration data from the NVSM and to control disk drive operations based upon the configuration data.

12. The method of claim 10, wherein the NVSM comprises flash memory.

13. The method of claim 10, wherein the SOC comprises a processor and the NVSM stores a disk drive start program such that the processor under the control of the disk drive start program controls the read and write operations of the HDA.

14. The method of claim 13, wherein the disk drive start program comprises firmware.

15. The method of claim 13, wherein the SOC further comprises a read/write channel and a servo controller.

16. The method of claim 10, wherein the configuration data comprises data indicating at least one of a type of disk drive family or a disk drive serial number.

17. The method of claim 10, wherein the configuration data comprises data indicating at least one of a type of head or a type of disk.

18. The method of claim 10, wherein the configuration data comprises at least one of: servo information, microjog information, track information, or calibration information.

19. A hard disk drive assembly (HDA) that is operable with a host computer that comprises a printed circuit board assembly (PCBA) including a system on a chip (SOC), the HDA comprising:
  a plurality of disks configured to store data;
  a plurality of heads configured to read and write data stored on the plurality of disks;
  a flex circuit board including a preamplifier, and configured to couple to the plurality of heads and the SOC of the host computer;
  a flex circuit cable coupled to the flex circuit board; and
  a non-volatile semiconductor memory (NVSM) located within the flex circuit cable, the NVSM configured to store configuration data for read and write operations of the HDA, wherein the configuration data is to be retrieved by the SOC for controlling the read and write operations of the HDA.

20. The HDA of claim 19, wherein the SOC comprises a processor and the NVSM stores a disk drive start program such that the processor under the control of the disk drive start program controls the read and write operations of the HDA.

* * * * *